US012076774B2

(12) United States Patent
Hamada et al.

(10) Patent No.: US 12,076,774 B2
(45) Date of Patent: Sep. 3, 2024

(54) PRESS-FORMING APPARATUS

(71) Applicant: Panasonic Intellectual Property Management Co., Ltd., Osaka (JP)

(72) Inventors: Hideaki Hamada, Hyogo (JP); Mitsuo Saitoh, Osaka (JP); Naoki Nojiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/805,457

(22) Filed: Jun. 4, 2022

(65) Prior Publication Data

US 2022/0410241 A1 Dec. 29, 2022

(30) Foreign Application Priority Data

Jun. 25, 2021 (JP) ................................ 2021-105877

(51) Int. Cl.
*B21D 24/10* (2006.01)
*B21D 22/20* (2006.01)
(Continued)

(52) U.S. Cl.
CPC ............. *B21D 24/10* (2013.01); *B21D 22/20* (2013.01); *B30B 15/0094* (2013.01); *B30B 15/26* (2013.01)

(58) Field of Classification Search
CPC ........ B21D 22/02; B21D 22/20; B21D 22/22; B21D 24/04; B21D 24/06; B21D 24/10; B21D 24/12; B30B 15/0094; B30B 15/14; B30B 15/28; B30B 15/287; B21C 51/00; G01L 5/0004; G01L 5/0052; G01L 5/16
See application file for complete search history.

(56) References Cited

U.S. PATENT DOCUMENTS 5,692,405 A 12/1997 Kirii
2009/0120151 A1* 5/2009 Kuwayama ............ B21D 37/00
72/350
(Continued)

FOREIGN PATENT DOCUMENTS

JP 1-266923 10/1989
JP 5-293556 11/1993
(Continued)

*Primary Examiner* — Debra M Sullivan
*Assistant Examiner* — Matthew Stephens
(74) *Attorney, Agent, or Firm* — Wenderoth, Lind & Ponack, L.L.P.

(57) ABSTRACT

A press-forming apparatus includes a punch, a die having an inclined surface, and a die holding plate. A blank holder has a holding surface, and a die load sensor detects a load in a pressing direction, a load in a first direction perpendicular to the pressing direction, and a load in a second direction perpendicular to the first direction. A controller calculates a normal force of the die based on the loads in the pressing direction, in the first direction, and in the second direction. The loads are detected by the die load sensor, and the controller calculates the amount of correction of clearance between the die and the blank holder based on the normal force of the die. The first driver moves the die in the pressing direction based on the amount of correction of clearance, and a second driver drives the punch in the pressing direction.

9 Claims, 12 Drawing Sheets

(51) Int. Cl.
*B30B 15/00* (2006.01)
*B30B 15/26* (2006.01)

(56) References Cited

U.S. PATENT DOCUMENTS

| | | | | |
|---|---|---|---|---|
| 2011/0132209 | A1* | 6/2011 | Senda | B30B 15/0094 100/50 |
| 2011/0192232 | A1* | 8/2011 | Kuwayama | B21D 22/22 73/799 |
| 2017/0100761 | A1* | 4/2017 | Wada | B21D 22/06 72/350 |
| 2017/0252792 | A1* | 9/2017 | Krönauer | B21D 37/10 72/350 |
| 2017/0305045 | A1* | 10/2017 | Antonini | B29C 43/58 72/350 |
| 2019/0321873 | A1 | 10/2019 | Wada et al. | |

FOREIGN PATENT DOCUMENTS

| | | | | |
|---|---|---|---|---|
| JP | 7-266100 | | 10/1995 | |
| JP | 2008272781 A | * | 11/2008 | B21D 22/20 |
| JP | 2010-214381 | | 9/2010 | |
| JP | 2018-069244 | | 5/2018 | |
| WO | 2015/178267 | | 11/2015 | |

* cited by examiner

PRESS-FORMING APPARATUS

BACKGROUND

1. Technical Field

The present disclosure relates to a press-forming apparatus.

2. Description of the Related Art

When a metal material is bent or drawn, for example, through press forming, production is generally performed after processing conditions are determined in advance for each material or in accordance with environmental changes.

For example, PTL 1 discloses a pressing-condition setting apparatus that sets processing conditions to obtain predetermined press quality for even a material varying in quality, plate thickness, or the like.

CITATION LIST

Patent Literature

PTL 1: Unexamined Japanese Patent Publication No. H07-266100

SUMMARY

A press-forming apparatus according to an aspect of the present disclosure processes a plate-shaped workpiece, the press-forming apparatus including: a punch that moves in a pressing direction; a die that has a hollow part into which the punch is inserted and has an inclined surface inclined toward the hollow part; a die plate that holds the die; a blank holder that is disposed between the punch and the die and has a holding surface facing the inclined surface of the die; a die load sensor that detects a load generated on the inclined surface of the die as a load divided into loads in three directions including a pressing direction, a first direction perpendicular to the pressing direction, and a second direction perpendicular to the pressing direction and the first direction; a controller that calculates normal force of the die based on the loads in the three directions which are detected by the die load sensor, and calculates the amount of correction of clearance between the die and the blank holder based on the normal force of the die; a first driver that moves the die in the pressing direction based on the amount of correction of clearance; and a second driver that drives the punch in the pressing direction.

Figure 1:
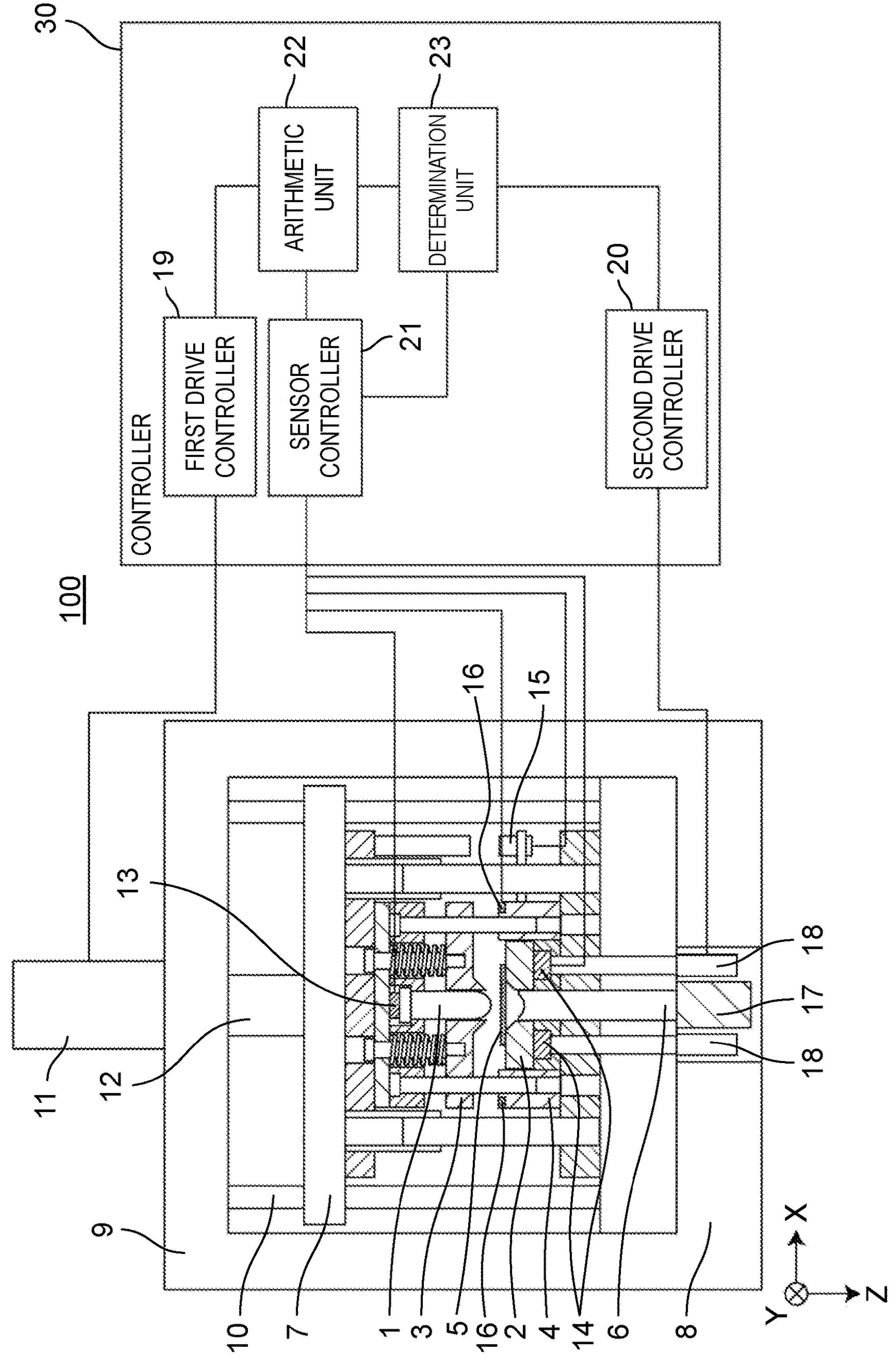
FIG. 1 is a schematic diagram illustrating a press-forming apparatus according to a first exemplary embodiment.

DETAILED DESCRIPTIONS (Background to the Present Disclosure)

When bending, drawing, or the like is performed using a press-forming apparatus, processing conditions are determined in advance in consideration of influence of material factors such as a material or a plate thickness of metal material to be processed or environmental factors caused by the press-forming apparatus. The processing conditions can be determined through experience or experiment, or by using simulation, for example. Prediction about the influence of material factors or environmental factors is often difficult, and thus various studies have been made as a method for controlling processing conditions in consideration of these influences.

For example, PTL 1 discloses a method in which a relationship between a physical quantity such as a shape of a press material (metal material) and an appropriate load for a blank holder (appropriate pressing conditions) is obtained in advance, and an appropriate amount of pushing with the blank holder is obtained from the relationship in accordance with an actual physical quantity.

The pressing-condition setting apparatus disclosed in PTL 1 still has a room for improvement in terms of stability of processing. Specifically, the pressing-condition setting apparatus disclosed in PTL 1 has a problem that a clearance between the blank holder and the die cannot be appropriately maintained due to a variation factor difficult in prediction, and thus stable processing cannot be performed. The variation factor difficult in prediction indicates a variation due to characteristics of a material of an object to be processed or an environmental change due to temperature. The variation factor difficult in prediction also indicates environmental changes such as due to forming speed, bottom dead center accuracy, processing dimensional accuracy of a die, force caused by a blank holder, clearance between the blank holder and the die, surface roughness of the die, lubricity between the object to be processed and the die, and the like regarding the press-forming apparatus and the die. Environmental changes as described above are difficult in prediction, and thus causing problems that acquiring an appropriate load of the blank holder in advance is difficult, and maintaining clearance between the blank holder and the die at an appropriate value is difficult.

For this reason, the present inventors have studied a press-forming apparatus capable of correcting clearance and performing stable processing to result in achieving the following disclosure. The present disclosure provides a press-forming apparatus capable of correcting clearance of a die and performing stable processing.

A press-forming apparatus according to a first aspect of the present disclosure processes a plate-shaped workpiece, the press-forming apparatus including: a punch that moves in a pressing direction; a die that has a hollow part into which the punch is inserted and has an inclined surface inclined toward the hollow part; a die plate that holds the die; a blank holder that is disposed between the punch and the die and has a holding surface facing the inclined surface of the die; a die load sensor that detects a load generated on the inclined surface of the die as a load divided into loads in three directions including a pressing direction, a first direction perpendicular to the pressing direction, and a second direction perpendicular to the pressing direction and the first direction; a controller that calculates normal force of the die based on the loads in the three directions which are detected by the die load sensor, and calculates the amount of correction of clearance between the die and the blank holder based on the normal force of the die; a first driver that moves the die in the pressing direction based on the amount of correction of clearance; and a second driver that drives the punch in the pressing direction.

This kind of configuration causes the amount of correction of clearance between the blank holder and the die to be calculated based on normal force of the die, so that a press-forming apparatus capable of performing stable processing while appropriately maintaining the clearance can be provided.

A press-forming apparatus according to a second aspect of the present disclosure may be configured such that the amount of correction of clearance is calculated based on a difference between an impulse calculated from normal force of the die at an appropriate clearance and processing time, and an impulse calculated from normal force of the die during processing and processing time.

This kind of configuration enables the amount of correction of clearance to be calculated more accurately.

A press-forming apparatus according to a third aspect of the present disclosure may further include a punch load sensor that detects a load of the punch applied in the pressing direction, in which the controller may calculate the amount of correction of pushing of the punch based on the load of the punch detected by the punch load sensor, and the second driver may drive the punch based on the amount of correction of pushing of the punch.

This kind of configuration enables performing more stable processing by correcting the amount of pushing of the punch.

A press-forming apparatus according to a fourth aspect of the present disclosure may be configured such that the amount of correction of pushing of the punch is calculated based on a difference between an impulse calculated from a load of the punch with an appropriate amount of pushing and processing time, and an impulse calculated from a load of the punch during processing and processing time.

This kind of configuration enables the amount of correction of pushing of the punch to be calculated more accurately.

A press-forming apparatus according to a fifth aspect of the present disclosure may further include a first gap sensor that detects that the punch is at a bottom dead center.

This kind of configuration enables determining whether an upper die including the punch is displaced from a lower die including the die of the press-forming apparatus.

A press-forming apparatus according to a sixth aspect of the present disclosure may further include a second gap sensor that detects contact between the blank holder and the die plate.

This kind of configuration enables determining whether a relative position of the blank holder with respect to the die plate is appropriate.

A press-forming apparatus according to a seventh aspect of the present disclosure may be configured such that the die includes multiple die pieces, and the die load sensor is disposed on each of the multiple die pieces.

This kind of configuration enables performing more stable processing by accurately calculating the amount of correction of clearance even in processing of a complicated shape.

Hereinafter, exemplary embodiments will be described with reference to the drawings.

First Exemplary Embodiment

[General Configuration]

Figure 2:
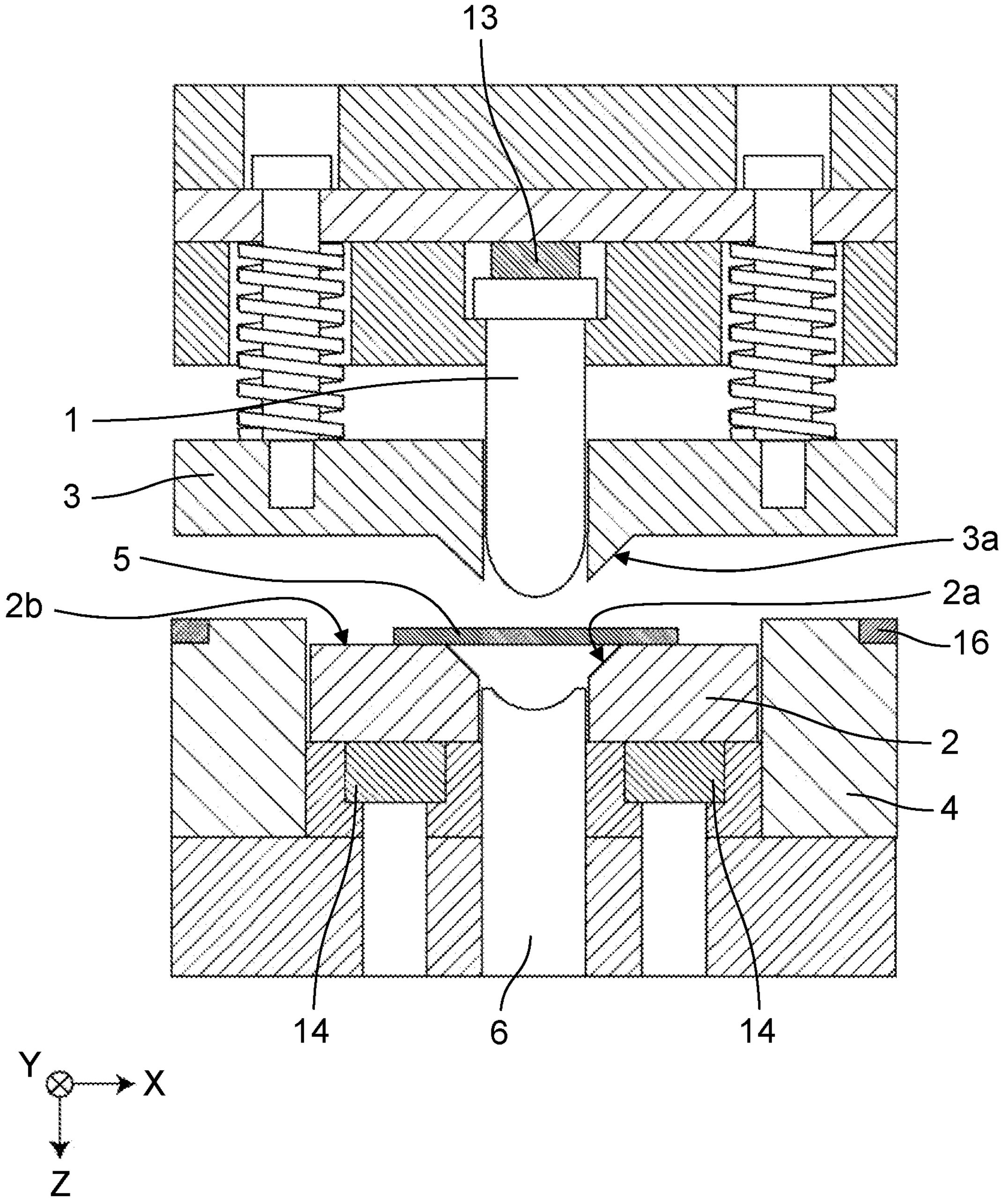
FIG. 2 is a schematic diagram illustrating a top dead center state of a punch of the press-forming apparatus of FIG. 1.
Figure 3:
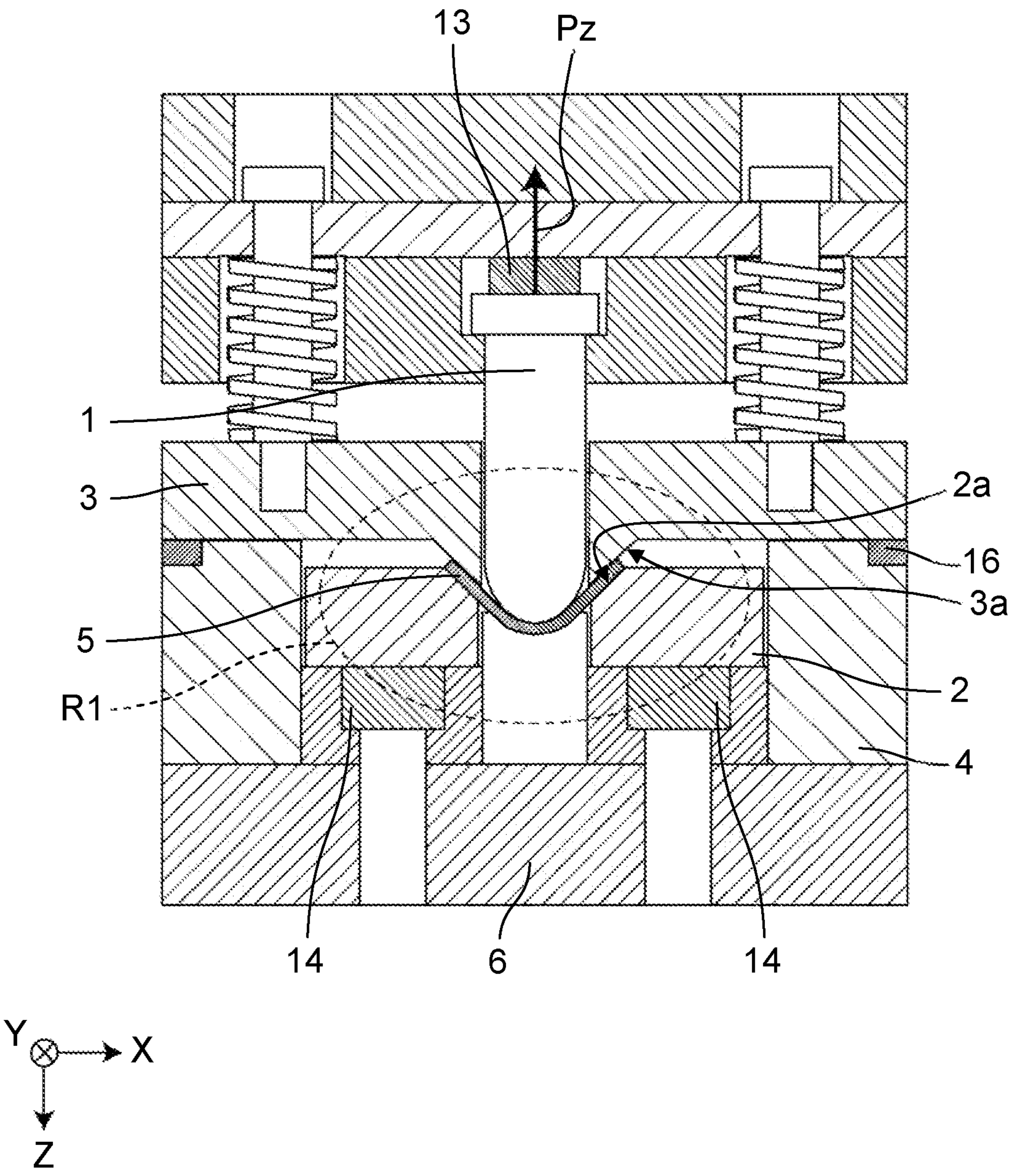
FIG. 3 is a schematic diagram illustrating a bottom dead center state of the punch of the press-forming apparatus of FIG. 1.
Figure 4:
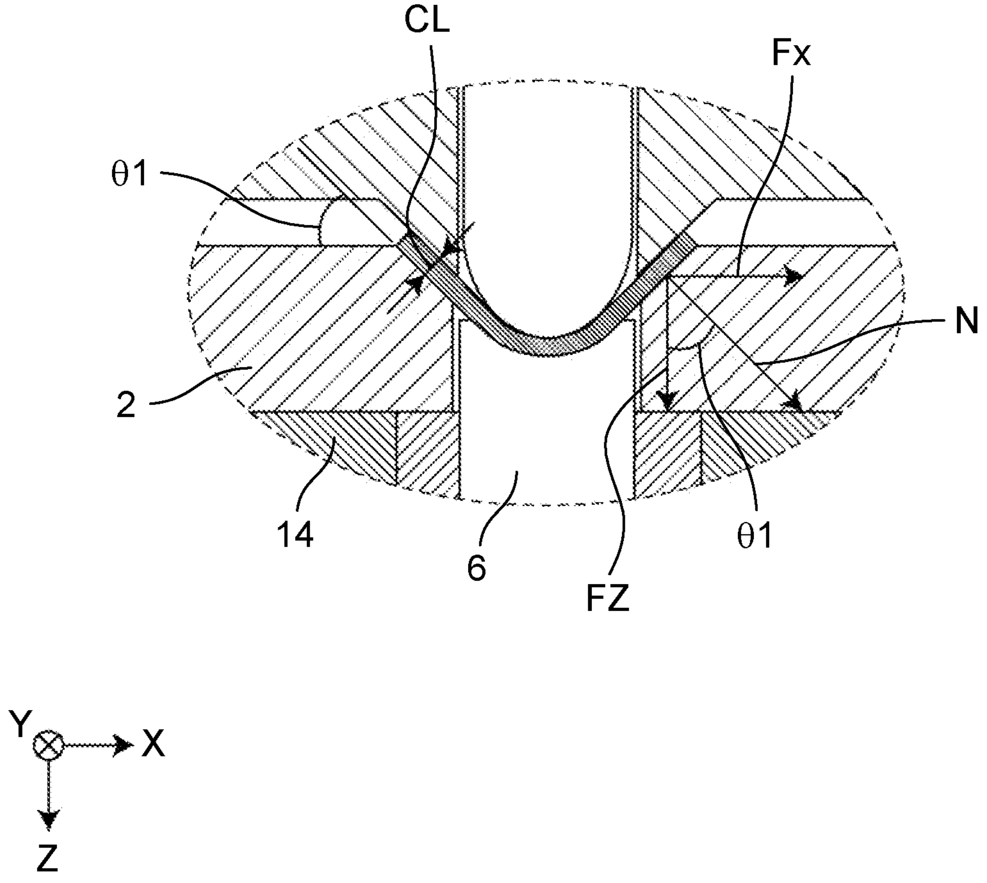
FIG. 4 is an enlarged view of region R1 in FIG. 3.
Figure 5:
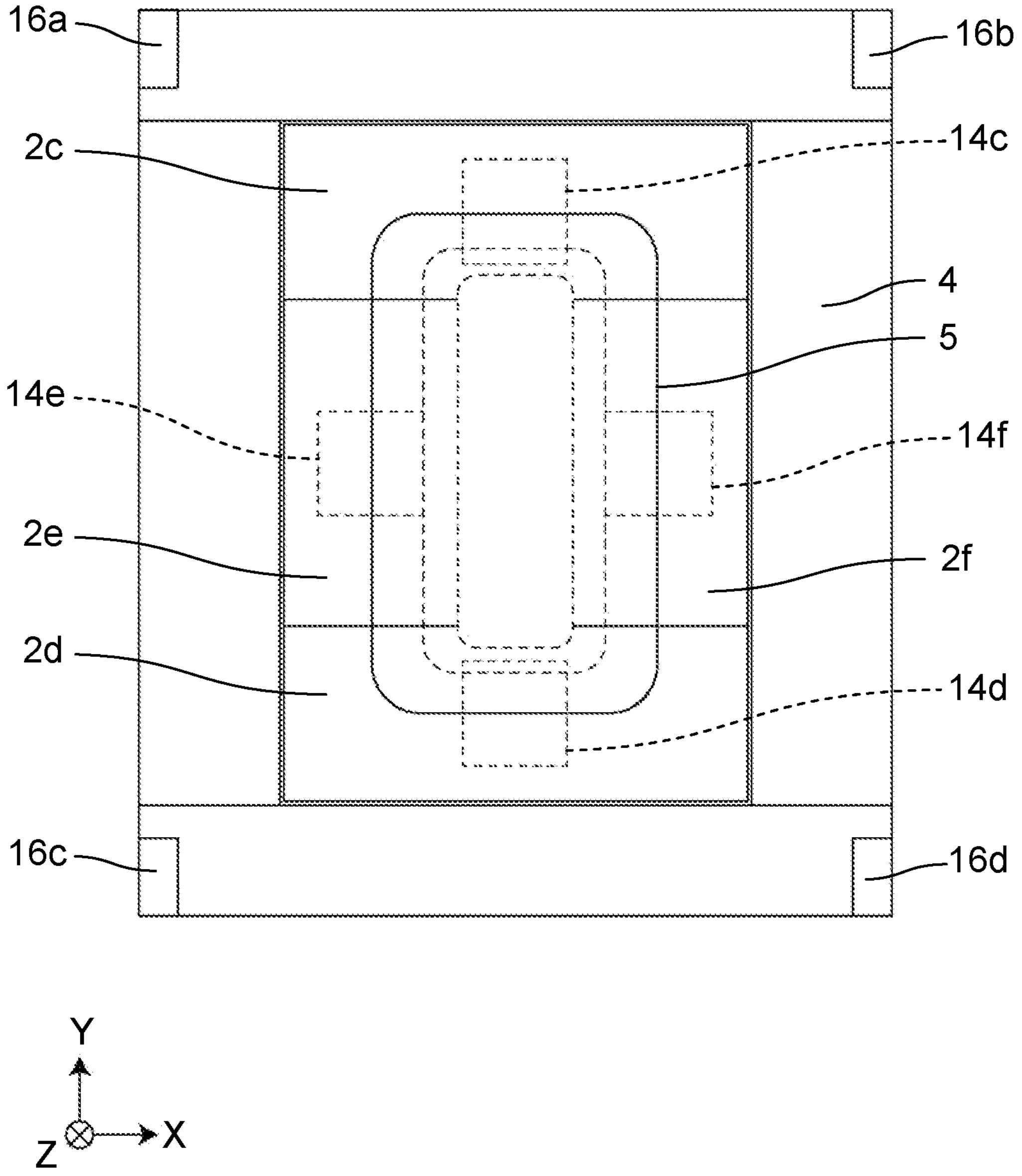
FIG. 5 is a plan view of a die and a die plate of the press-forming apparatus of FIG. 1.

FIG. 1 is a schematic diagram illustrating press-forming apparatus 100 according to a first exemplary embodiment. FIG. 2 is a schematic diagram illustrating a top dead center state of punch 1 of press-forming apparatus 100 of FIG. 1. FIG. 3 is a schematic diagram illustrating a bottom dead center state of punch 1 of press-forming apparatus 100 of FIG. 1. FIG. 4 is an enlarged view of region R1 in FIG. 3. FIG. 5 is a plan view of die 2 and die plate 4 of press-forming apparatus 100 of FIG. 1. In FIGS. 2 to 5, some components are eliminated.

As illustrated in FIG. 1, press-forming apparatus 100 includes punch 1, die 2, blank holder 3, die plate 4, die load sensor 14, controller 30, first driver 11, and second driver 18, to press a workpiece such as a sheet metal. In the present exemplary embodiment, press-forming apparatus 100 performs bending and drawing. In the present exemplary embodiment, press-forming apparatus 100 further includes punch load sensor 13, first gap sensor 15, and second gap sensor 16.

Press-forming apparatus 100 corrects clearance between die 2 and blank holder 3 based on loads applied to die 2 and punch 1 detected by die load sensor 14 and punch load sensor 13, respectively. Correcting the clearance based on the loads applied during processing enables performing stable processing.

Punch 1 is a tool for pressing against workpiece 5 for processing and is attached to slide 7.

As illustrated in FIG. 2, die 2 includes a hollow part into which punch 1 is inserted, and inclined surface 2*a* inclined from upper surface 2*b* toward the hollow part, and is attached to bolster 8. In the hollow part of die 2, ejector 6 that separates workpiece 5 after processing from die 2 is disposed. Ejector 6 is driven by air cylinder 17.

As illustrated in FIG. 5, die 2 includes four die pieces 2*c* to 2*f*. Die piece 2*c* and die piece 2*d* have symmetrical shapes, and die piece 2*e* and die piece 2*f* have symmetrical shapes. In the present exemplary embodiment, die piece 2*c* and die piece 2*d* are disposed facing each other in a Y-direction, and die piece 2*e* and die piece 2*e* are disposed facing each other in an X-direction.

Die 2 including multiple die pieces 2*c* to 2*f* enables reduction in influence that may be caused by processing accuracy, surface roughness, a wear state of punch 1, or the like by adjusting a position of each of die pieces 2*c* to 2*f*, so that stable processing can be performed.

Blank holder 3 is attached to slide 7 together with punch 1, and presses workpiece 5 against inclined surface 2*a* of die 2 during pressing. Blank holder 3 includes holding surface 3*a* facing inclined surface 2*a* of die 2 (see FIG. 2).

Die plate 4 is a member that holds die 2.

Slide 7 is connected to servomotor 11 via ball screw 12. Servomotor 11 rotates ball screw 12 to drive slide 7 in a pressing direction (Z-direction) at a predetermined speed. Slide 7 is guided by shaft 10 to be vertically driven in the Z-direction with respect to bolster 8. When slide 7 is vertically driven with respect to bolster 8, punch 1 is moved toward die 2 to enable workpiece 5 placed on die 2 to be bent and drawn. The servomotor 11 corresponds to the second driver of the present exemplary embodiment.

Punch 1, die 2, blank holder 3, die plate 4, ejector 6, slide 7, bolster 8, and shaft 10 are attached to forming apparatus body 9.

Die 2 is moved in the pressing direction (Z-direction) by actuator 18 based on the amount of correction of clearance described later. Actuator 18 corresponds to the first driver of the present exemplary embodiment.

Die load sensor 14 detects a load applied to die 2 during processing. The die load sensor is a triaxial load sensor that detects a load applied to die 2 as load components in three directions. In the present exemplary embodiment, die load sensor 14 detects a load applied to die 2 as load components in the pressing direction (Z-direction), a first direction (X-direction) perpendicular to the Z-direction, and a second direction (Y-direction) perpendicular to the pressing direction and the first direction.

In the present exemplary embodiment, die load sensor 14 includes four die load sensors 14*c* to 14*f* disposed one by one on die pieces 2*c* to 2*f*, respectively, as illustrated in FIG. 5. Die load sensor 14*c* and die load sensor 14*d* are disposed symmetrically while facing each other in the Y-direction. Die load sensor 14*e* and die load sensor 14*f* are disposed symmetrically while facing each other in the X-direction.

Punch load sensor 13 detects a load applied to punch 1 during processing. Punch load sensor 13 is a uniaxial load sensor that detects load Pz (see FIG. 3) applied to punch 1 in the pressing direction.

Controller 30 calculates normal force of die 2 based on the load detected by die load sensor 14 to calculate the amount of correction of clearance between die 2 and blank holder 3 based on the normal force of die 2. Details of controller 30 will be described later.

First gap sensor 15 detects that punch 1 is at a bottom dead center, or punch 1 is at the lowest possible position. For example, first gap sensor 15 is attached to an appropriate position on a lower die of press-forming apparatus 100 including die 2, die plate 4, ejector 6, and bolster 8, and detects contact between an upper die including punch 1, blank holder 3, and slide 7, and the lower die to determine that punch 1 is at the bottom dead center. For example, disposing first gap sensors 15 at respective four corners of the lower die enables determination whether the upper die and the lower die are parallel.

Second gap sensors 16 are disposed at respective four corners of die plate 4 and detect contact between blank holder 3 and die plate 4. In the present exemplary embodiment, second gap sensors 16*a* to 16*d* are disposed at the respective four corners of die plate 4 as illustrated in FIG. 5. Whether blank holder 3 and die plate 4 are parallel to each other can be determined using a difference in timing of contact between blank holder 3 and die plate 4, the contact being detected by each of second gap sensors 16*a* to 16*d* disposed at the respective four corners of die plate 4.

Controller 30 includes first drive controller 19, second drive controller 20, sensor controller 21, arithmetic unit 22, and determination unit 23. Controller 30 includes a digital circuit such as a microcomputer, a CPU, an MPU, a GPU, a DSP, an FPGA, or an ASIC, for example.

First drive controller 19 causes servomotor 11 to be driven to rotate ball screw 12, thereby vertically driving slide 7 in the pressing direction (Z-direction) at a predetermined speed.

Second drive controller 20 causes actuator 18 to be driven based on the amount of correction of clearance described later to move die 2 in the pressing direction (Z-direction).

Sensor controller 21 is electrically connected to die load sensor 14, punch load sensor 13, first gap sensor 15, and second gap sensor 16, and outputs detection values of the respective sensors to arithmetic unit 22 or determination unit 23.

Arithmetic unit 22 calculates normal force and a difference in impulse based on the detection value from die load sensor 14 or punch load sensor 13. Details will be described later.

Determination unit 23 determines whether to perform clearance correction based on the calculation result of arithmetic unit 22.

Press-forming apparatus 100 causes workpiece 5 to be placed on upper surface 2*b* of die 2 when punch 1 is at the top dead center as illustrated in FIG. 2. Punch 1 at the top dead center indicates that punch 1 is at the highest possible position. With workpiece 5 placed on upper surface 2*b* of die 2, punch 1 is lowered in the pressing direction to start processing.

As punch 1 is lowered, blank holder 3 attached to slide 7 is also lowered. As a result, forming processing with punch 1 is performed while workpiece 5 is sandwiched and pressed between holding surface 3*a* of blank holder 3 and inclined surface 2*a* of die 2 as illustrated in FIG. 3. Inclined surface 2*a* of die 2 is here formed to be inclined at angle $\theta 1$ with respect to upper surface 2*b* as illustrated in FIG. 4. Holding surface 3*a* of blank holder 3 is formed facing inclined surface 2*a* of die 2, or being inclined at angle $\theta 1$ with respect to upper surface 2*b* of die 2.

As punch 1 is lowered, a leading end of punch 1 comes into contact with workpiece 5 to form workpiece 5. When blank holder 3 and die plate 4 come into contact with each other (see FIG. 3), punch 1 is at the bottom dead center. At this time, predetermined clearance CL is provided between blank holder 3 and die 2, or between holding surface 3*a* of blank holder 3 and inclined surface 2*a* of die 2 in the present exemplary embodiment as illustrated in FIG. 4.

In the present exemplary embodiment, a position of die 2 in the pressing direction or the amount of pushing of punch 1 is adjusted based on loads detected by die load sensor 14 and punch load sensor 13 so that clearance CL has an appropriate value.

Die load sensor 14 detects a load applied to die 2 from when punch 1 starts to be lowered to when punch 1 reaches the bottom dead center. Specifically, the load applied to die 2 is detected as load components in three directions including load Fz in the pressing direction (Z-direction), load Fx in the first direction (X-direction), and load Fy in the second direction (Y-direction), as illustrated in FIG. 4. Load Fz in the pressing direction is a load component acting in the pressing direction of die 2. Load Fx in the first direction and load Fy in the second direction are each a load component in a direction orthogonal to the pressing direction. Load Fy in the second direction is not illustrated. Load Fy is a very small value compared with load Fx and load Fz, so that influence of load Fy on load Fx and load Fz can be ignored. In the present exemplary embodiment, die load sensor 14 includes four die load sensors 14*c* to 14*f* disposed on die pieces 2*c* to 2*f*, respectively. Thus, four die load sensors 14*c* to 14*f* detect loads Fx, Fy, and Fz in three directions and normal force N for die pieces 2*c* to 2*f*, respectively.

Punch load sensor 13 detects a load applied to punch 1 in the pressing direction.

Figure 6:
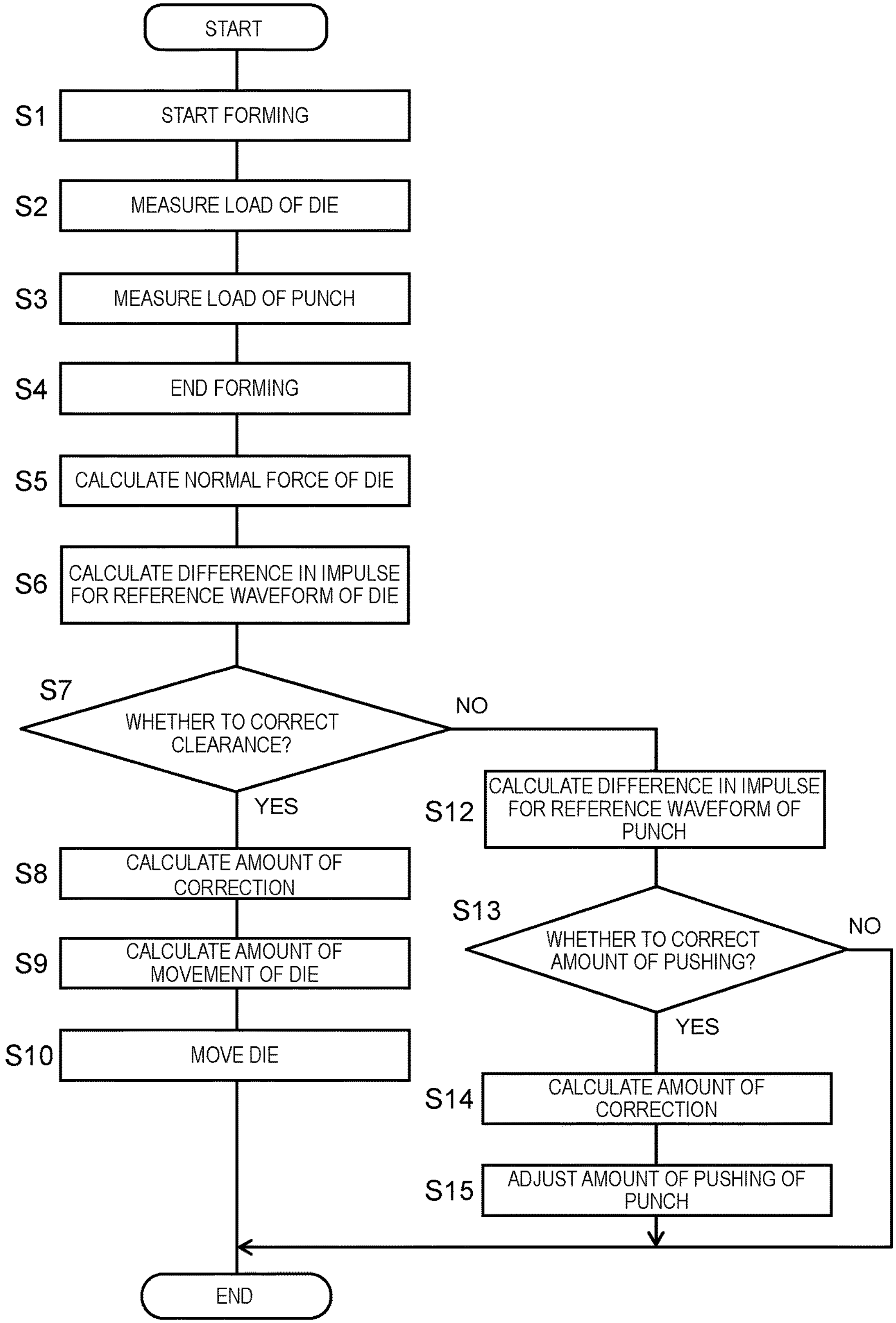
FIG. 6 is a flowchart illustrating a clearance correction process in the press-forming apparatus of FIG. 1.

With reference to FIG. 6, there will be described a method for correcting clearance between holding surface 3*a* of blank holder 3 and inclined surface 2*a* of die 2 based on the load detected by each of load sensors 13, 14. FIG. 6 is a flowchart illustrating a clearance correction process in press-forming apparatus 100 of FIG. 1.

Clearance CL between holding surface 3*a* of blank holder 3 and inclined surface 2*a* of die 2 is adjusted to an appropriate value in advance, and then forming is started (step S1). Next, die load sensor 14 detects a load applied to die 2 (step S2). Load F (Fx, Fy, Fz) detected by die load sensor 14 is output to arithmetic unit 22 via sensor controller 21. At the same time when die load sensor 14 detects the load, punch load sensor 13 detects a load applied to punch 1 (step S3). Load Pz (see FIG. 3) detected by punch load sensor 13 is output to arithmetic unit 22 via sensor controller 21. When the forming is completed (step S4), arithmetic unit 22 calculates normal force N of die 2 (step S5).

Normal force N of die 2 is calculated based on load F (Fx, Fy, Fz) of die 2 using Expression (1). In Expression (1), θ1 is an angle at which inclined surface 2*a* is inclined with respect to upper surface 2*b* of die 2 (see FIG. 4).

[Expression 1]

$$N=Fx\times\sin\theta 1+Fz\times\cos\theta 1 \quad (1).$$

When normal force N is calculated, arithmetic unit 22 calculates a difference in impulse with respect to normal force N of die 2 (step S6).

Figure 7:
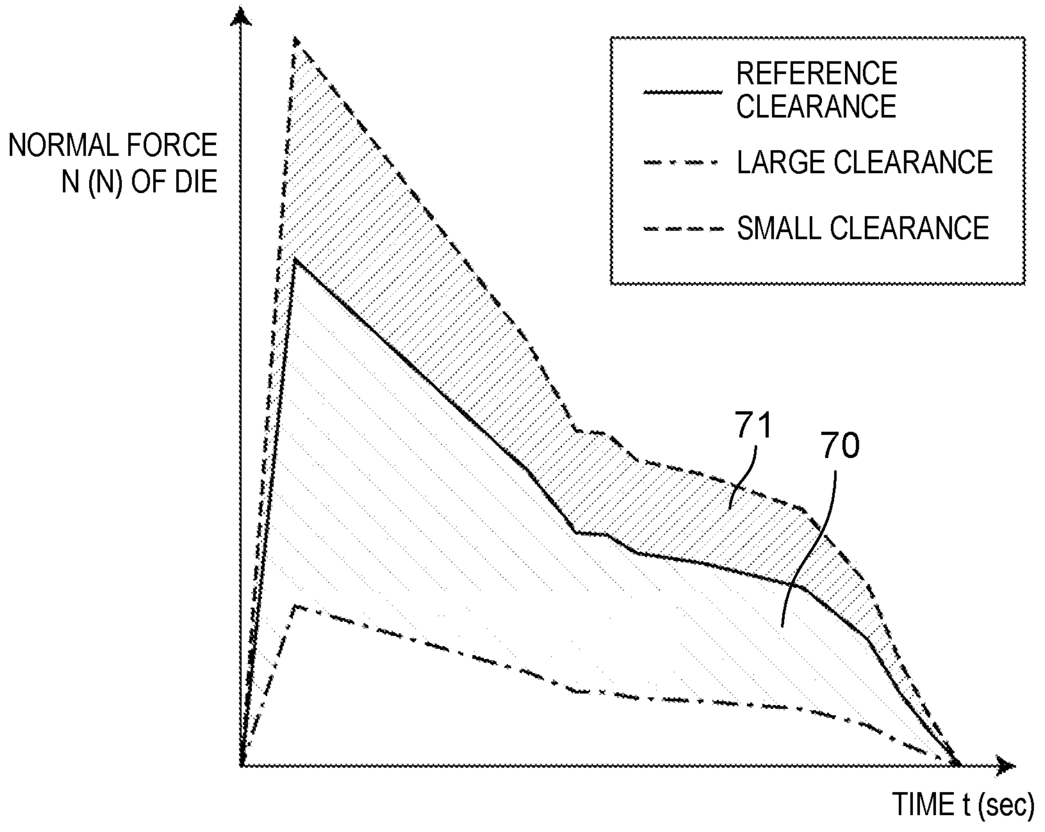
FIG. 7 is a graph illustrating a relationship between normal force of a die and processing time from a start of forming.

FIG. 7 is a graph illustrating a relationship between normal force N of die 2 and processing time t from a start of forming. As illustrated in FIG. 7, normal force N of die 2 calculated by arithmetic unit 22 has magnitude acquired as waveform data indicating the relationship with the processing time from the start of forming.

When the magnitude of clearance CL is an appropriate value or a reference clearance, the waveform data on normal force N is a waveform indicated by a solid line in FIG. 7. When the magnitude of clearance CL is larger than the reference clearance, the waveform data on normal force N is a waveform indicated by a one-dot chain line in FIG. 7. When the magnitude of clearance CL is smaller than the reference clearance, the waveform data on normal force N is a waveform indicated by a broken line in FIG. 7.

As illustrated in FIG. 7, when the magnitude of clearance CL during forming is larger than the reference clearance, normal force N of die 2 becomes smaller than that when the magnitude is the reference clearance throughout forming time. Conversely, when the magnitude of clearance CL is smaller than the reference clearance, normal force N of die 2 becomes larger than when the magnitude is the reference clearance throughout the forming time.

An impulse of normal force N is acquired by multiplying normal force N by time, and is calculated by acquiring an area of the waveform data in FIG. 7. A difference in impulse of die 2 is a difference between an impulse in the case of the reference clearance and an impulse based on normal force N calculated in step S5. In the present exemplary embodiment, a difference between the impulse calculated based on normal force N and the impulse in the case of the reference clearance is calculated, and whether to correct the magnitude of clearance CL is determined based on a value of the difference.

For example, when the magnitude of clearance CL is larger than the reference clearance, the difference in impulse is calculated by acquiring an area of region 70 in FIG. 7. Additionally, when the magnitude of clearance CL is smaller than the reference clearance, the difference in impulse is calculated by acquiring an area of region 71 in FIG. 7.

Determination unit 23 determines whether to correct the clearance based on the difference in impulse of normal force N of die 2 (step S7). For example, an upper limit value and a lower limit value of the difference in impulse are set in advance, and then it can be determined that the clearance correction is performed when a value of the difference in impulse exceeds the upper limit value or falls below the lower limit value.

For example, when the difference in impulse exceeds ±10% of the impulse in the case of the reference clearance, or when a difference in area from an area of a waveform in the case of the reference clearance exceeds ±10%, it is determined to correct the clearance (Yes in step S7). That is, when the difference in impulse exceeds ±10% of the impulse in the case of the reference clearance, it is determined to correct the clearance. When the difference in impulse is included within ±10% of the reference clearance, it is determined that the difference in impulse is within a reference and the clearance is not corrected (No in step S7).

When it is determined to correct the clearance (Yes in step S7), arithmetic unit 28 calculates the amount of correction (step S8). The amount of correction is a value indicating an increase or a decrease in magnitude of clearance CL.

Figure 8:
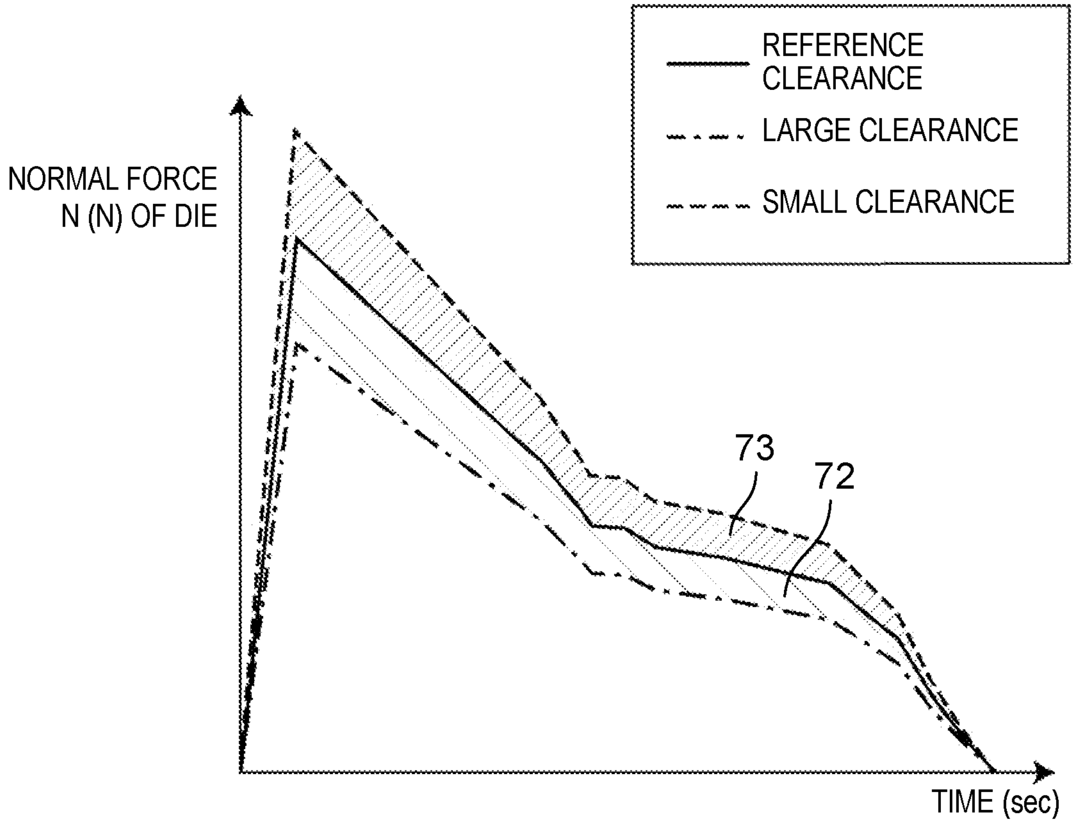
FIG. 8 is a graph illustrating a relationship between the normal force of the die and the processing time from the start of forming under a difference in impulse within ±20%.
Figure 9:
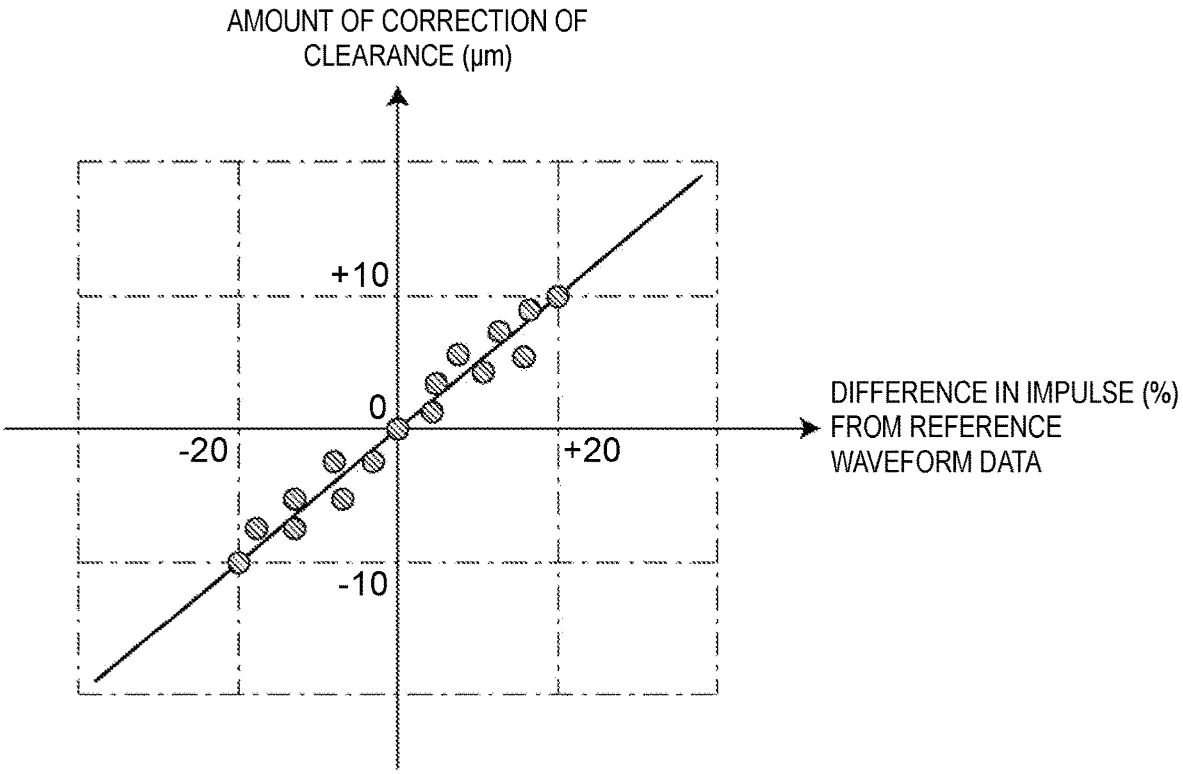
FIG. 9 is a graph illustrating a relationship between a difference in impulse and the amount of correction of clearance.

FIG. 8 is a graph illustrating a relationship between normal force N and processing time t when the difference in impulse is within ±20%. FIG. 9 is a graph illustrating a relationship between a difference in impulse and the amount of correction of clearance CL. FIG. 8 illustrates region 72 corresponding to a difference in impulse of −20%, and region 73 corresponding to a difference in impulse of +20%. FIG. 9 is a graph in which amounts of correction of clearance CL with a difference in impulse from −20% to +20% inclusive are plotted, the amounts of correction being experimentally acquired. FIG. 8 has a horizontal axis representing a difference in impulse (%), and a vertical axis representing the amount of correction (μm) of clearance.

According to the graphs of FIGS. 8 and 9, a difference in impulse of −20% indicates that the clearance is larger than the reference, and the amount of correction of clearance is −10 μm, for example. That is, clearance CL is corrected to be reduced in magnitude by 10 μm. That is, this correction indicates that die 2 is moved upward (−Z-direction). Then, a difference in impulse of +20% indicates that the clearance is smaller than the reference, and the amount of correction of clearance is +10 μm. This case indicates that clearance CL is corrected to be increased in magnitude by 10 μm. That is, this correction indicates that die 2 is moved downward (+Z-direction).

The amounts of correction based on experimental results are as illustrated in the graph of FIG. 9, and Expression (2) is established where the amount of correction is ΔCL and a difference in impulse is D1.

[Expression 2]

$$\Delta CL=a\times D1 \quad (2).$$

Here, coefficient a changes depending on a wear state of punch 1 or the like. Thus, when coefficient a is changed by acquiring experimental results as illustrated in the graph of FIG. 9 every several shots, for example, the amount of correction ΔCL can be accurately calculated.

Next, arithmetic unit 22 calculates the amount of movement of die 2 (step S9). The amount of movement of die 2 indicates the amount of movement of die 2 in the pressing direction.

Here, when the amount of movement is indicated as ΔH and magnitude of the reference clearance is indicated as CL1, the relationship of Expression (3) is established between the amount of movement ΔH and reference clearance CL1.

[Expression 3]

$$CL1 - \frac{\Delta H}{2} = (2 \times CL1 - \Delta H) \times \cos\theta 1 \quad (3)$$

The amount of movement ΔH with a positive number means that die 2 is moved in the −Z-direction, and when the amount of movement ΔH with a negative number means that die 2 is moved in the +Z-direction.

Next, actuator 18 is driven to move die 2 based on the amount of movement ΔH calculated, thereby correcting the magnitude of clearance CL (step S10), and then processing proceeds to step S11.

Returning to step S7, when it is determined that the clearance is not corrected based on the difference in impulse of die 2 (No in step S7), arithmetic unit 22 calculates a difference in impulse of load Pz applied to punch 1 (step S12).

Figure 10:
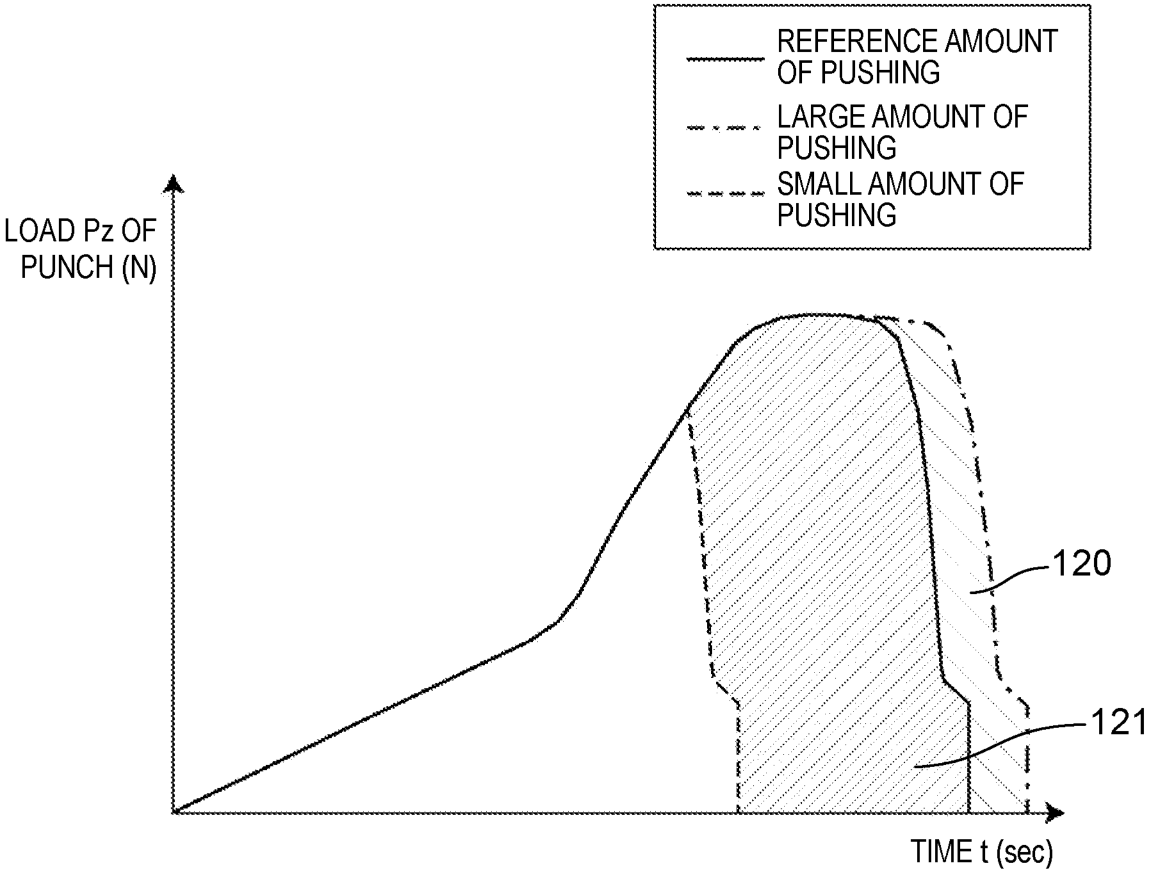
FIG. 10 is a graph illustrating a relationship between a load applied to a punch and processing time from a start of forming.

FIG. 10 is a graph illustrating a relationship between load Pz applied to punch 1 and processing time t from a start of forming. As illustrated in FIG. 10, load Pz applied to punch 1 and calculated by arithmetic unit 22 has magnitude acquired as waveform data indicating the relationship with the processing time from the start of forming.

When the amount of pushing of punch 1 has magnitude with an appropriate value, or is a reference amount of pushing, waveform data on load Pz is a waveform indicated by a solid line in FIG. 10. When the magnitude of the amount of pushing is larger than the reference amount of pushing, the waveform data on load Pz is a waveform indicated by a one-dot chain line in FIG. 10. When the magnitude of the amount of pushing is smaller than the reference amount of pushing, the waveform data on load Pz is a waveform indicated by a broken line in FIG. 10. The amount of pushing of punch 1 indicates a position of punch 1 when punch 1 reaches the bottom dead center.

An impulse of load Pz is acquired by multiplying load Pz by time, and is calculated by acquiring an area of the waveform data in FIG. 10. A difference in impulse of punch 1 is a difference between an impulse in the case of the reference amount of pushing and an impulse of load Pz applied to punch 1 and detected in step S3. In the present exemplary embodiment, a difference between the impulse based on load Pz detected and the impulse in the case of the reference amount of pushing is calculated, and whether to correct the amount of pushing of punch 1 is determined based on a value of the difference.

For example, when the magnitude of the amount of pushing is larger than the reference amount of pushing, the difference in impulse is calculated by acquiring an area of region 120 in FIG. 10. Additionally, when the magnitude of the amount of pushing is smaller than the reference amount of pushing, the difference in impulse is calculated by acquiring an area of region 121 in FIG. 10.

Determination unit 23 determines whether to correct the amount of pushing based on the difference in impulse of load Pz (step S13). For example, an upper limit value and a lower limit value of the difference in impulse are set in advance, and then it can be determined that the amount of pushing is corrected when a value of the difference in impulse exceeds the upper limit value or falls below the lower limit value.

For example, when the difference in impulse exceeds ±10% of the impulse in the case of the reference amount of pushing, it is determined to correct the amount of pushing (Yes in step S13). That is, when the difference in impulse exceeds ±10% of the reference amount of pushing, it is determined to correct the amount of pushing. When the difference in impulse is included within ±10% of the reference amount of pushing, it is determined that the difference in impulse is within a reference and the amount of pushing is not corrected (No in step S13).

When it is determined to correct the amount of pushing (Yes in step S13), arithmetic unit 28 calculates the amount of correction (step S14). The amount of correction is a value indicating a position when the punch 1 is at the bottom dead center and a movement distance of punch 1 in the pressing direction (Z-direction).

Figure 11:
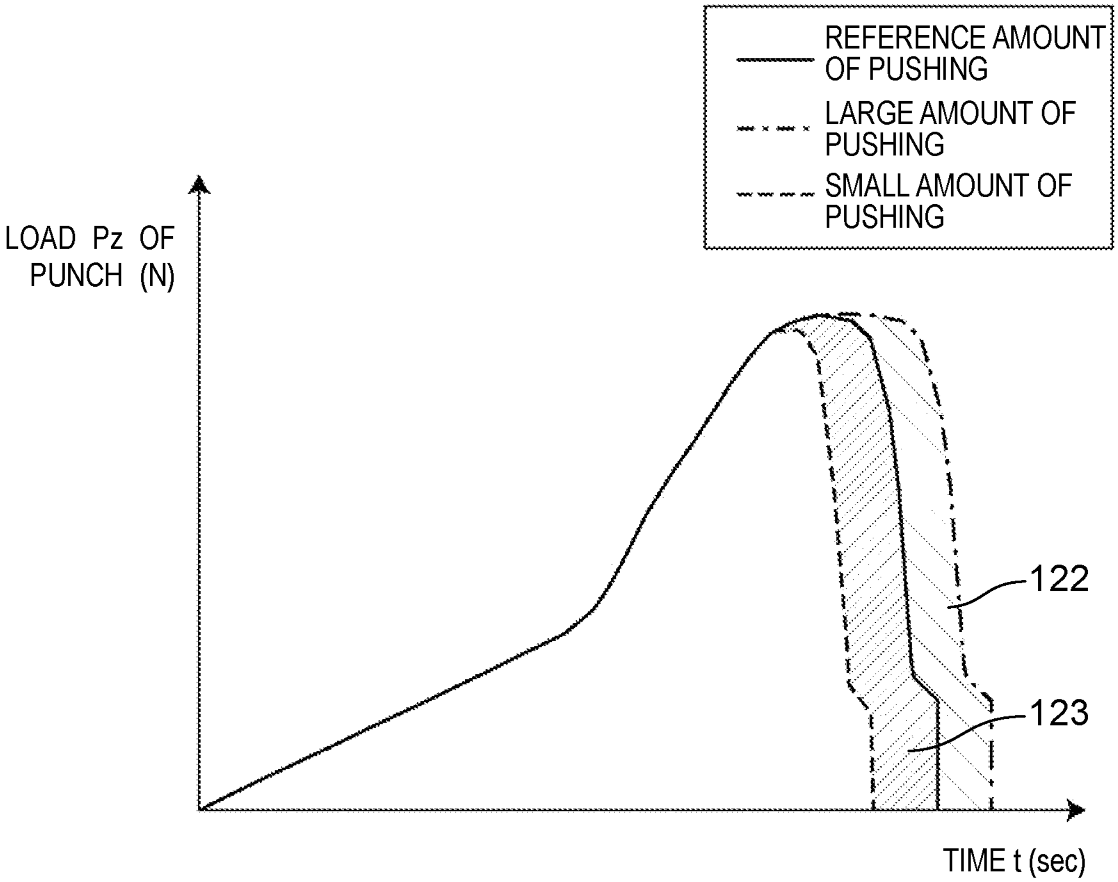
FIG. 11 is a graph illustrating a relationship between a load applied to a punch and processing time from a start of forming under a difference in impulse within ±20%.
Figure 12:
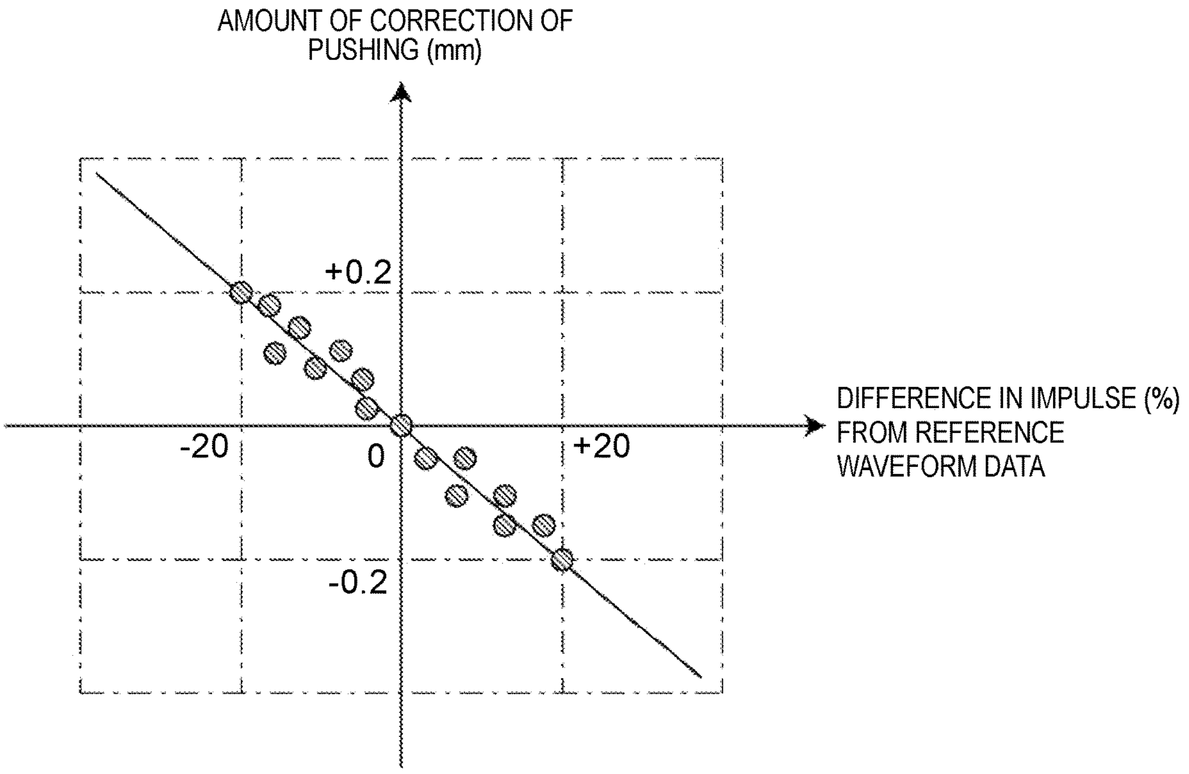
FIG. 12 is a graph illustrating a relationship between a difference in impulse and the amount of correction of the amount of pushing.

FIG. 11 is a graph illustrating a relationship between load Pz and processing time t when the difference in impulse is within ±20%. FIG. 12 is a graph illustrating a relationship between a difference in impulse and the amount of correction of the amount of pushing. FIG. 11 illustrates region 122 corresponding to a difference in impulse of −20%, and region 123 corresponding to a difference in impulse of +20%. FIG. 12 is a graph in which amounts of correction of the amount of pushing with a difference in impulse from −20% to +20% inclusive are plotted, the amounts of correction being experimentally acquired. FIG. 12 has a horizontal axis representing a difference in impulse (%), and a vertical axis representing the amount of correction (mm) of the amount of pushing.

According to FIGS. 11 and 12, a difference in impulse of −20% indicates that the amount of pushing is smaller than the reference, and the amount of correction of the amount of pushing is +0.2 mm, for example. That is, the position of punch 1 at the bottom dead center is moved downward in the pressing direction (+Z-direction) by 0.2 mm. Then, a difference in impulse of +20% indicates that the amount of pushing is larger than the reference, and the amount of correction of the amount of pushing is −0.2 mm. This case indicates that the position of punch 1 at the bottom dead center is moved downward in the pressing direction (+Z-direction) by 0.2 mm.

The amounts of correction based on experimental results are as illustrated in the graph of FIG. 12, and Expression (4) is established where the amount of correction is ΔPR and a difference in impulse is D2.

[Expression 4]

$$\Delta PR = -b \times D2 \quad (4).$$

Here, coefficient b changes depending on a wear state of punch 1 or the like. Thus, when coefficient b is changed by acquiring experimental results as illustrated in the graph of FIG. 12 every several shots, for example, the amount of correction ΔPR can be accurately calculated.

Next, the amount of pushing of punch 1 is corrected based on the calculated amount of correction ΔPR by controlling servo motor 11 (step S15).

When die 2 is moved (step S10) or the amount of pushing of punch 1 is corrected (step S15), the processing ends.

[Effects]

The present disclosure enables providing a press-forming apparatus capable of correcting the clearance and performing stable processing. Specifically, the exemplary embodiments described above cause the amount of correction of clearance between the blank holder and the die to be calculated based on normal force of the die, so that a press-forming apparatus capable of performing stable processing while appropriately maintaining the clearance can be provided.

Although the exemplary embodiments described above each show an example in which press-forming apparatus 100 includes punch load sensor 13 and corrects the amount of pushing of punch 1 based on load Pz applied to punch 1, punch load sensor 13 is not an essential component.

Then, although the exemplary embodiments described above each show an example in which die 2 includes four die pieces 2*c* to 2*f*, the present disclosure is not limited thereto. Die 2 may include one die piece, or may include two or more die pieces. In this case, die load sensor 14 is preferably disposed on each die piece.

Additionally, although the exemplary embodiments described above each show an example in which press-forming apparatus 100 includes first gap sensor 15 and second gap sensor 16, first gap sensor 15 and second gap sensor 16 are not essential components.

The press-forming apparatus of the present disclosure can be applied to a case where bending or drawing is performed on a workpiece, such as a part of a home electric appliance or medical equipment, the workpiece being thin in thickness and being less likely to stretch due to high hardness.

What is claimed is:

1. A press-forming apparatus that processes a plate-shaped workpiece, the press-forming apparatus comprising:

a punch configured to move in a pressing direction;

a die including a hollow part into which the punch is inserted and an inclined surface inclined toward the hollow part;

a die plate configured to hold the die;

a blank holder disposed between the punch and the die and that includes a holding surface facing the inclined surface of the die, and a clearance provided between the holding surface of the blank holder and the die;

a die load sensor configured to detect a load generated on the inclined surface of the die by detecting load components in three directions including a pressing direction, a first direction perpendicular to the pressing direction, and a second direction perpendicular to the pressing direction and the first direction;

a controller configured to calculate a normal force on the die based on the loads in the three directions detected by the die load sensor, configured to determine whether to perform clearance correction based on the calculation result of the normal force, and configured to calculate an amount of correction of clearance regarding the clearance when it is decided to perform the clearance correction;

a first driver configured to move the die in the pressing direction based on the amount of correction of clearance to change a position of the die in the pressing direction at the time of machining the workpiece; and a second driver configured to drive the punch in the pressing direction.

2. The press-forming apparatus according to claim 1, wherein the amount of correction of clearance is calculated based on a difference between an impulse calculated from normal force of the die at an appropriate clearance and processing time, and an impulse calculated from normal force of the die during processing and processing time.

3. The press-forming apparatus according to claim 1, further comprising:

a punch load sensor configured to detect a load of the punch applied in the pressing direction, wherein the controller calculates an amount of correction of pushing of the punch based on the load of the punch detected by the punch load sensor, and the second driver drives the punch based on the amount of correction of pushing of the punch.

4. The press-forming apparatus according to claim 3, wherein the amount of correction of pushing of the punch is calculated based on a difference between an impulse calculated from a load of the punch with an appropriate amount of pushing and processing time, and an impulse calculated from a load of the punch during processing and processing time.

5. The press-forming apparatus according to claim 1, further comprising a first gap sensor configured to detect that the punch is at a bottom dead center.

6. The press-forming apparatus according to claim 1, further comprising a second gap sensor configured to detect contact between the blank holder and the die plate.

7. The press-forming apparatus according to claim 1, wherein the die includes multiple die pieces, and the die load sensor is disposed on each of the multiple die pieces.

8. The press-forming apparatus according to claim 1, wherein the die load sensor is attached to a surface of the die opposite to a surface on which the workpiece is placed in the pressing direction.

9. The press-forming apparatus according to claim 1, wherein the clearance is provided between the holding surface of the blank holder and the inclined surface of the die.

* * * * *